UNITED STATES PATENT OFFICE.

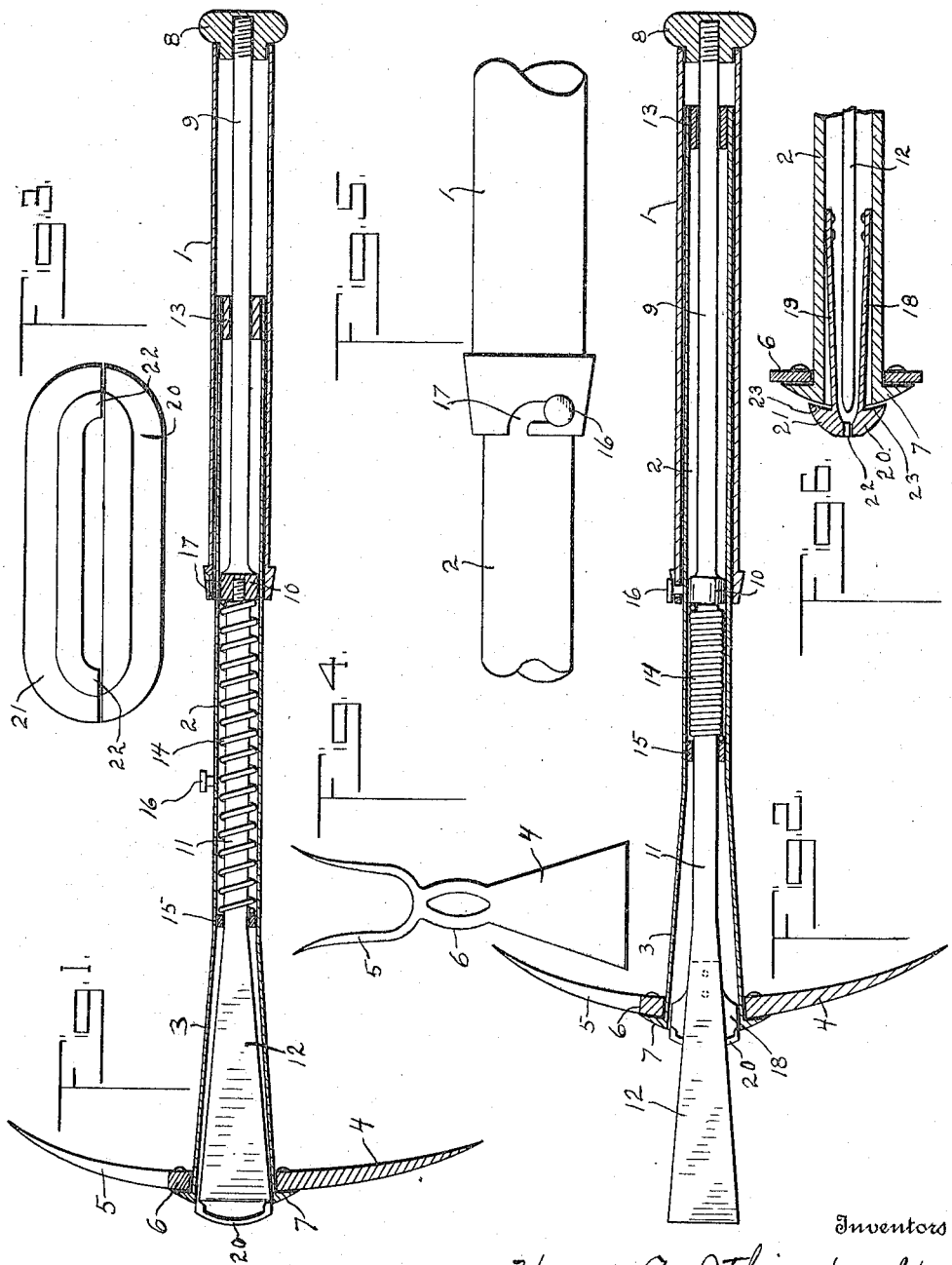

HENRY A. ATKINS AND THEODOR FRAUDSEN, OF MOLINE, ILLINOIS.

GARDEN AND LAWN TOOL.

1,221,650.  Specification of Letters Patent.  Patented Apr. 3, 1917.

Application filed December 18, 1916. Serial No. 137,501.

*To all whom it may concern:*

Be it known that we, HENRY A. ATKINS and THEODOR FRAUDSEN, citizens of the United States, residing at Moline, in the county of Rock Island and State of Illinois, have invented certain new and useful Improvements in Garden and Lawn Tools, of which the following is a specification.

Our invention has reference to garden and lawn tools, and is intended for use in removing weeds and other foreign matter. It is provided with several implements, each of which is useful, especially in removal of weeds of a larger kind, such as dandelions, burdocks, and the like.

The particular construction and advantages of our device will more fully appear in the following specification, reference being had to the drawings accompanying the same, in which:

Figure 1 is a longitudinal section of our invention in extended position. Fig. 2 is a similar view thereof with the handle sections telescoped. Fig. 3 is an end view of the jaws 20 and 21. Fig. 4 is a detail of the cultivating head of the tool. Fig. 5 is an enlarged detail, showing the locking means for the handle sections. Fig. 6 is a longitudinal cross-section of the end of the head 3.

Corresponding parts of the device are indicated by similar reference characters throughout the several figures.

1 represents a cylindrical handle, in which is telescopically held a cylindrical section 2, having a flattened head 3, at the outer end of which are secured a hoe 4 and fork 5, by means of a collar 6 uniting said hoe and fork, and fixed to the outwardly turned end 7 of the head 3. At the outer end of the handle 1 is a knob 8, in which is secured one end of a rod 9, the other end of said rod being provided with a head 10, in which is secured the shank 11 of a blade 12, normally housed in the head 3. The inner end of the section 2 is provided with a guide-sleeve 13, slidable on the rod 9, and assisting in steadying the movement of the part 2 in the handle 1.

The sections 1 and 2 are normally held in extended position by means of a coiled spring 14, interposed between the head 10 and a collar 15 fixed on the inside of the cylinder 2, such collar also acting as a guide for the shank 11. In this position the tools 4 and 5 can be used for the purpose of cultivating about plants or flowers, in removing weeds, and loosening the soil. The chief purpose of the blade 12 is that of severing roots of large weeds at some depth below the ground, and when it is desired to use the same the sections 1 and 2 are drawn together into the position shown in Fig. 2, and held in such position by means of a button 16 on the part 2 entering and engaging an angular slot 17 on the inner end of the handle 1. The blade thereupon protrudes from the end of the head 3, and can be forced into the ground for a desired depth. After a weed has thus been cut off below the ground it can be dug out by means of the hoe 4 or fork 5 without returning the blade to its former position. When it is desired to discontinue the use of the blade 12 the parts 1 and 2 are disconnected, whereupon the spring 14 forces said sections apart, causing the blade 12 to again disappear within the head 3.

In the outer end of the head 3 is secured a pair of spring plates 18 and 19, on the outer ends of which are cleaners 20 and 21, which are forced apart by the blade 12 when it is protruded, and when such blade is withdrawn such cleaners return to a nearly closed position, preventing dirt from entering the end of the tool. The earth is prevented from working in from the sides by means of curved extensions 22 on the jaw 21. Material is also precluded from getting in between the plates 18 and 19 and the inner face of the head 3 by means of shoulders 23 on the jaws 20 and 21.

When the blade 12 is protruded by telescoping the sections 1 and 2, such blade automatically forces the jaws 20 and 21 apart, and when the tool is being used with the blade concealed the contact of the end of the blade with said jaws assists the spring 14 in holding the parts 1 and 2 in extended position. A little force is required to drive the blade between the jaws.

What we claim as our invention, and desire to secure by Letters Patent of the United States, is:

1. A device of the class described, comprising a telescopic handle; a tool secured to one end of said handle; a tool concealed within said handle adjacent to said first-named tool, and adapted to protrude therefrom when said handle is contracted; and means for holding said handle normally in extended position.

2. A device of the class described, comprising a telescopic handle; a pair of grubbing tools projected laterally from one end thereof in opposite directions; a tool concealed within said handle adjacent to said first-named tool and adapted to protrude therefrom when said handle is contracted; and means for holding said handle normally in an extended position.

3. A device of the class described, comprising a cylindrical handle; a cylindrical section telescopically movable therein and provided with a housing at its outer end; a cutting tool concealed in said housing and adapted to protrude therefrom when said cylindrical member is telescoped within said handle; and means for holding said handle and cylindrical section in extended position.

4. A device of the class described, comprising a cylindrical handle; a cylindrical section telescopically movable therein and provided with a housing at its outer end; a cutting tool located in said housing and adapted to protrude therefrom when said handle sections are telescoped; a grubbing tool carried on the end of said housing adjacent to said cutting tool; and means for holding said handle sections normally in an extended position.

5. A device of the class described, comprising a cylindrical handle; a cylindrical section telescopically movable in said handle and provided with a housing at its outer end; a cutting tool concealed within said housing and adapted to protrude therefrom when said handle sections are contracted; cleaners yieldably mounted at the end of said housing, separable by said cutting tool; means for holding said handle sections normally in extended position; and means for locking said handle sections in a contracted position.

6. A device of the class described, comprising a cylindrical handle; a cylindrical section telescopically movable in said handle and provided with a housing at its outer end; a cutting tool concealed within said housing and adapted to protrude therefrom when said handle sections are contracted; a grubbing implement carried on the end of said housing adjacent to said tool; means for holding said handle sections normally in extended position; and means for cleaning said tool when it is withdrawn within said housing.

In testimony whereof we affix our signatures in presence of two witnesses.

HENRY A. ATKINS.
THEODOR FRAUDSEN.

Witnesses:
W. N. HASKELL,
A. J. MEEHAN.

Copies of this patent may be obtained for five cents each, by addressing the "Commissioner of Patents, Washington, D. C."